United States Patent
VanBlon et al.

(10) Patent No.: US 10,694,242 B2
(45) Date of Patent: Jun. 23, 2020

(54) MECHANISMS FOR CASTING CONTENT

(71) Applicant: Lenovo (Singapore) Pte. Ltd., Singapore (SG)

(72) Inventors: Russell Speight VanBlon, Raleigh, NC (US); Rod D. Waltermann, Rougemont, NC (US); John Carl Mese, Cary, NC (US); Nathan J. Peterson, Oxford, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 251 days.

(21) Appl. No.: 15/085,333

(22) Filed: Mar. 30, 2016

(65) Prior Publication Data

US 2017/0289614 A1 Oct. 5, 2017

(51) Int. Cl.
G06F 15/16 (2006.01)
H04N 21/436 (2011.01)
H04N 21/472 (2011.01)
H04N 21/647 (2011.01)
H04N 21/422 (2011.01)
H04N 21/442 (2011.01)

(52) U.S. Cl.
CPC . *H04N 21/43615* (2013.01); *H04N 21/42201* (2013.01); *H04N 21/44218* (2013.01); *H04N 21/47217* (2013.01); *H04N 21/647* (2013.01)

(58) Field of Classification Search
CPC .............. G06F 3/0346; G06F 3/167; H04N 2005/44521; H04N 2005/44573; H04N 21/4126; H04N 21/4825; H04N 21/25891; H04N 21/4122; H04N 21/4131; H04N 21/4183; H04N 21/42201; H04N 21/42204; H04N 21/42219; H04N 21/42224; H04N 21/4316; H04N 21/4345; H04N 21/43615; H04N 21/44008; H04N 21/4622; H04N 21/472; H04N 21/4722; H04N 21/4756; H04N 21/4782; H04N 21/4788; H04N 21/4826; H04N 21/6125; H04N 21/6131; H04N 21/6587; H04N 21/8186; H04N 21/8586; H04N 5/2222; H04N 5/44513

See application file for complete search history.

(56) References Cited

U.S. PATENT DOCUMENTS

| | | | | |
|---|---|---|---|---|
| 62,298,378 | * | 2/2016 | McKenzie | H04L 67/18 |
| 9,871,838 B2 | * | 1/2018 | McRae | H04L 65/4076 |
| 2015/0199547 A1 | * | 7/2015 | Fraccaroli | G06Q 10/10 340/10.1 |
| 2015/0334335 A1 | * | 11/2015 | White | H04N 21/4126 348/734 |
| 2016/0259616 A1 | * | 9/2016 | Hosein | H04M 1/72519 |
| 2016/0321848 A1 | * | 11/2016 | Ricci | G07C 9/00158 |

* cited by examiner

*Primary Examiner* — Chirag R Patel
*Assistant Examiner* — Rachel J Hackenberg
(74) *Attorney, Agent, or Firm* — Ference & Associates LLC

(57) ABSTRACT

One embodiment provides a method, including: identifying, using a processor on a first device, content intended for playback; identifying, using a sensor of the first device, a casting ready target device; the identifying including obtaining data associating a user operating the first device with the cast ready target device; and directing content for casting on the cast ready target based on the data. Other aspects are described and claimed.

20 Claims, 5 Drawing Sheets

MECHANISMS FOR CASTING CONTENT

BACKGROUND

User devices, e.g., tablets, smart phones, laptop computers, etc., are increasingly used to stream content. In certain use contexts, users wish to stream content on one device and then switch to another device. A common example is to begin watching a video on a tablet or smart phone and then transfer the content to another device in the room, e.g., a television. This transfer process is referred to as casting.

In order to cast content from one device to another, a user can select a target device from of a list of potential target devices available to cast to. Unfortunately, the list is often long and populated with devices that were not named with user convenience in mind. This makes it difficult for the user to select the right device. The user looses a lot of time when the wrong device is selected. For example, the user may need to stop content play, reselect another device, and restart the content play.

BRIEF SUMMARY

In summary, one aspect provides a method, comprising: identifying, using a processor on a first device, content intended for playback; identifying, using a sensor of the first device, a casting ready target device; said identifying comprising obtaining data associating a user operating the first device with the cast ready target device; and directing content for casting on the cast ready target based on the data.

Another aspect provides a device, comprising: a sensor; a processor operatively coupled to the sensor; and a memory storing code that is executable by the processor to: identify content intended for playback; identify, using the sensor, a casting ready target device; wherein the code that is executable by the processor to identify is executable by the processor to obtain data associating a user operating the device with the cast ready target device; and direct content for casting on the cast ready target based on the data.

A further aspect provides a product, comprising: a storage device having code stored therewith, the code being executable by a processor and comprising: code that identifies, using a processor on a first device, content intended for playback; code that identifies, using a sensor of the first device, a casting ready target device; said code that identifies comprising code that obtains data associating a user operating the first device with the cast ready target device; and code that directs content for casting on the cast ready target based on the data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As conventional techniques for casting content, e.g., selecting a target device from a list on the source device, are not user-friendly, the embodiments described herein provide intuitive mechanisms for the user to select more easily a target device to cast content. Example techniques are described herein and relate to a shift in focus from listing devices to inferring an appropriate target device based on user behavior(s), whether explicit or implicit.

The illustrated example embodiments will be best understood by reference to the figures. The following description is intended only by way of example, and simply illustrates certain example embodiments.

Figure 1:
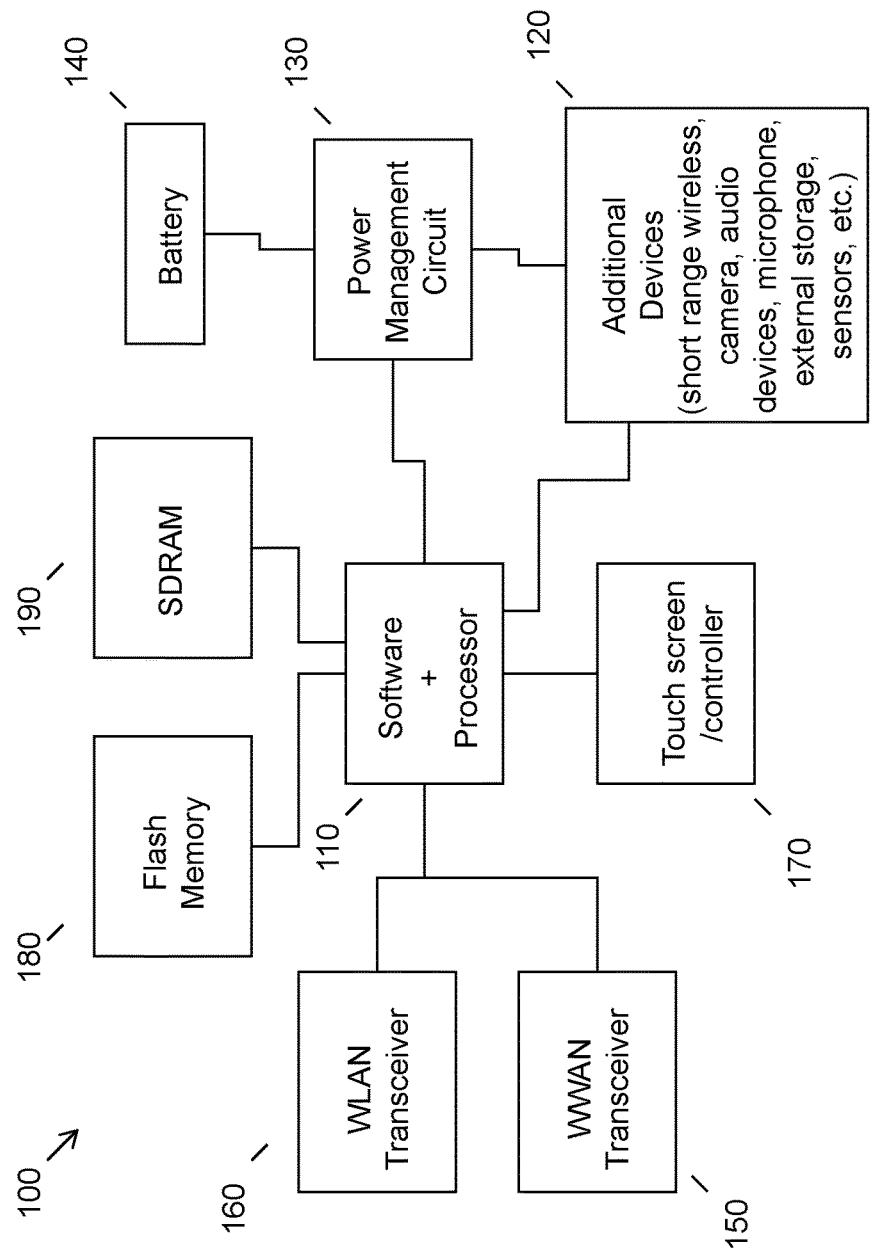
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a one or more cameras, a short range wireless device for communicating with other devices, and the like. System 100 often includes a touch screen 170 for data input and display/rendering. System 100 also typically includes various memory devices, for example flash memory 180 and SDRAM 190.

Figure 2:
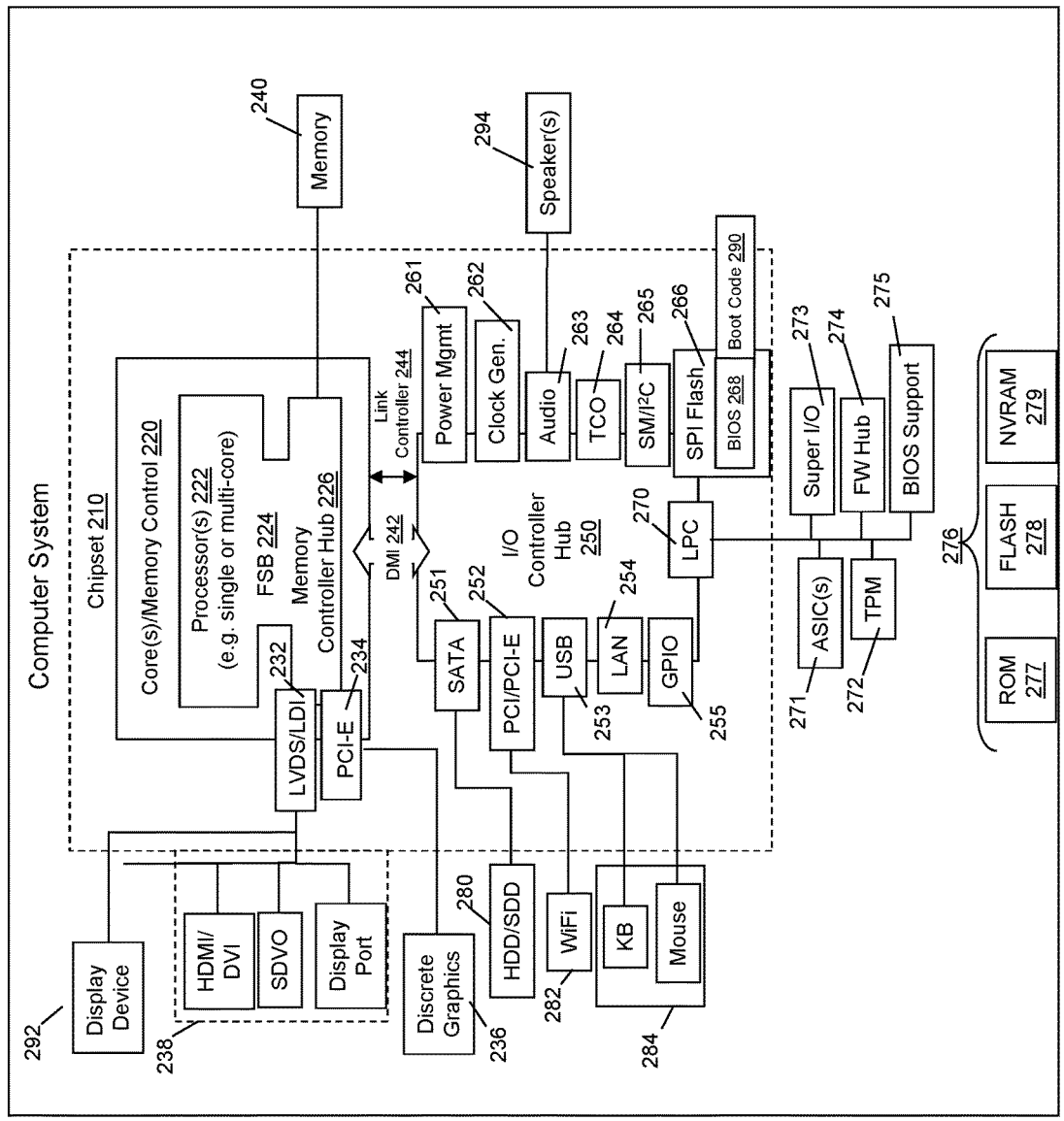
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices used to cast content. For example, a device including circuitry such as that outlined in FIG. 1 may be used to begin content play (e.g., multimedia content such as a video or audio content such as a music file), whereas a device including circuitry such as that outlined in FIG. 2 may be used to receive a cast content stream from another user device.

Figure 3:
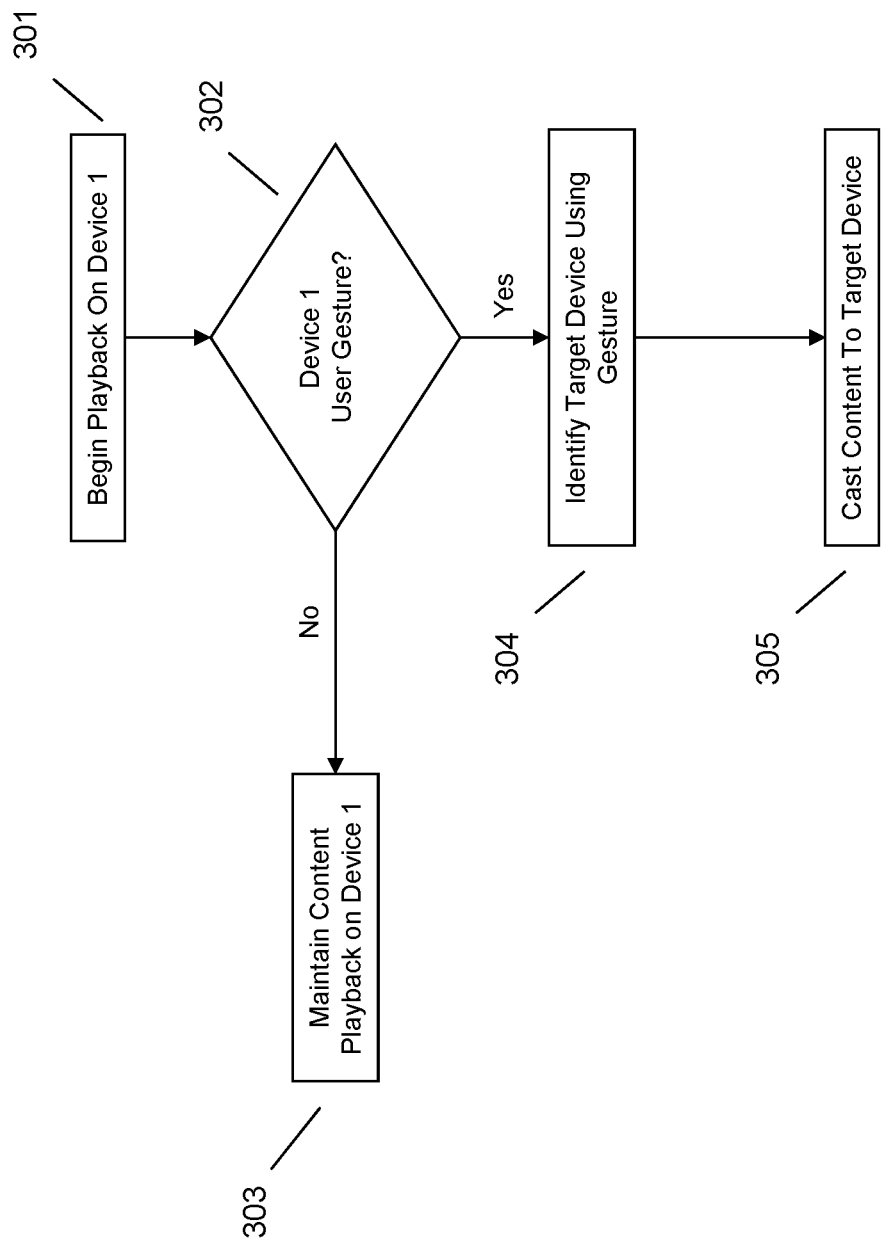
FIG. 3 illustrates an example method of identifying a cast ready target using gesture detection.

Illustrated in FIG. 3 is an example of casting content to a target device using gestures. As shown at 301, a user begins content playback on a first device, in this example, Device 1, e.g., a user tablet device. An embodiment is programmed to detect, e.g., using Device 1, one or more predetermined user gestures that can be leveraged to disambiguate among several cast ready devices, e.g., a television, a laptop computer, etc. For example, the user may gesture, point, or fling in the direction of a target device, e.g., a television that is capable of wirelessly streaming content from the tablet device for display.

An embodiment detects at 302 that the gesture has occurred and selects a target device based on the gesture. For example, an accelerometer and/or gyroscope of Device 1 may detect the direction of the gesture input and identify, as illustrated at 304, any cast-ready device(s), e.g., a television, in that direction and within a predetermined vicinity, e.g., within wireless range of the tablet device, i.e., Device 1, as the target device. Of course, if no such devices are identified, the content playback may be maintained on Device 1, as indicated at 303.

However, if a target device is identifiable using the gesture input, e.g., accelerometer inputs of Device 1 indicating motion in the direction of a cast ready target device, then an embodiment may cast the content to the target device, as illustrated at 305, for content playback, which may start automatically.

Figure 4:
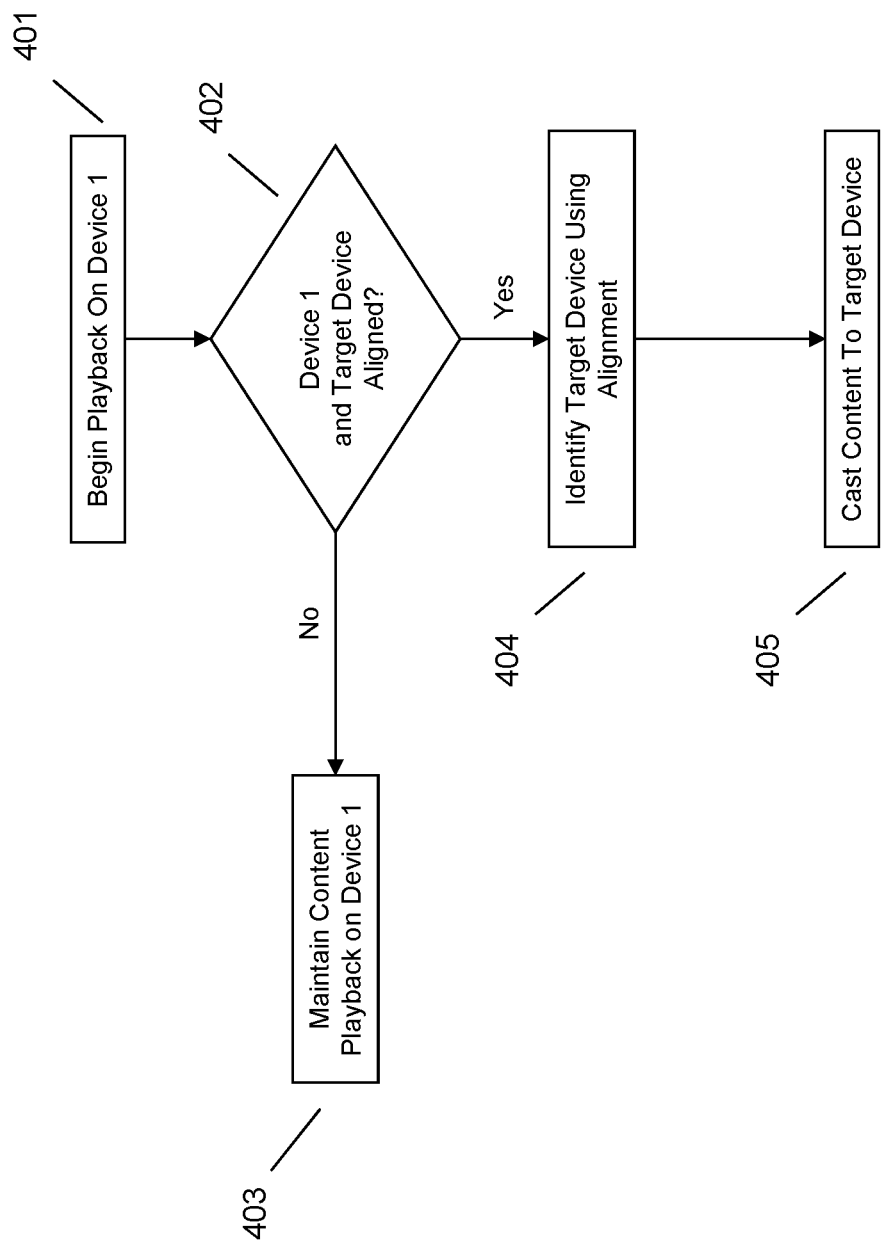
FIG. 4 illustrates an example method of identifying a cast ready target using device alignment.

As another example of an intuitive mechanism for the casting of content, illustrated in FIG. 4, a user may cast content between devices using device alignment. By way of specific example, at 401 a user may begin content play on a first device, again in this example Device 1, e.g., a smart phone, and thereafter hold Device 1 up so that it is aligned between the user's head or eyes and the target device, e.g., a television. The user's eyes, if looking towards both Device 1 and the target device, as for example detected by cameras of Device 1 (front camera detecting the user, rear camera detecting the target), provide a predetermined alignment, as detected at 402. By way of specific example, when Device 1 is held in this alignment and a cast ready target device is identified, as illustrated at 404, via a rear camera of Device 1 (or wireless sensor, etc.). If there is no such predetermined device alignment, an embodiment may maintain content playback on Device 1, as illustrated at 403.

Device 1 may prompt the user to cast the content, e.g., using a gesture, a voice command, a touch input, etc. Device 1 may also cast the content automatically to the target, as illustrated at 405. For example, content may be automatically cast to the target device if there is high confidence that a user doesn't normally watch content with Device 1 in that orientation and/or relative alignment with the target device.

The confidence that the predetermined device alignment has been achieved (as with other target device identifications) may be increased in a variety of ways. For example, an embodiment may use a specific orientation of Device 1 as part of the alignment detection at 402, e.g. a vertical alignment of Device 1, facing the user, with target device behind Device 1 may be required for automatic casting of content for playback on the target device.

Figure 5:
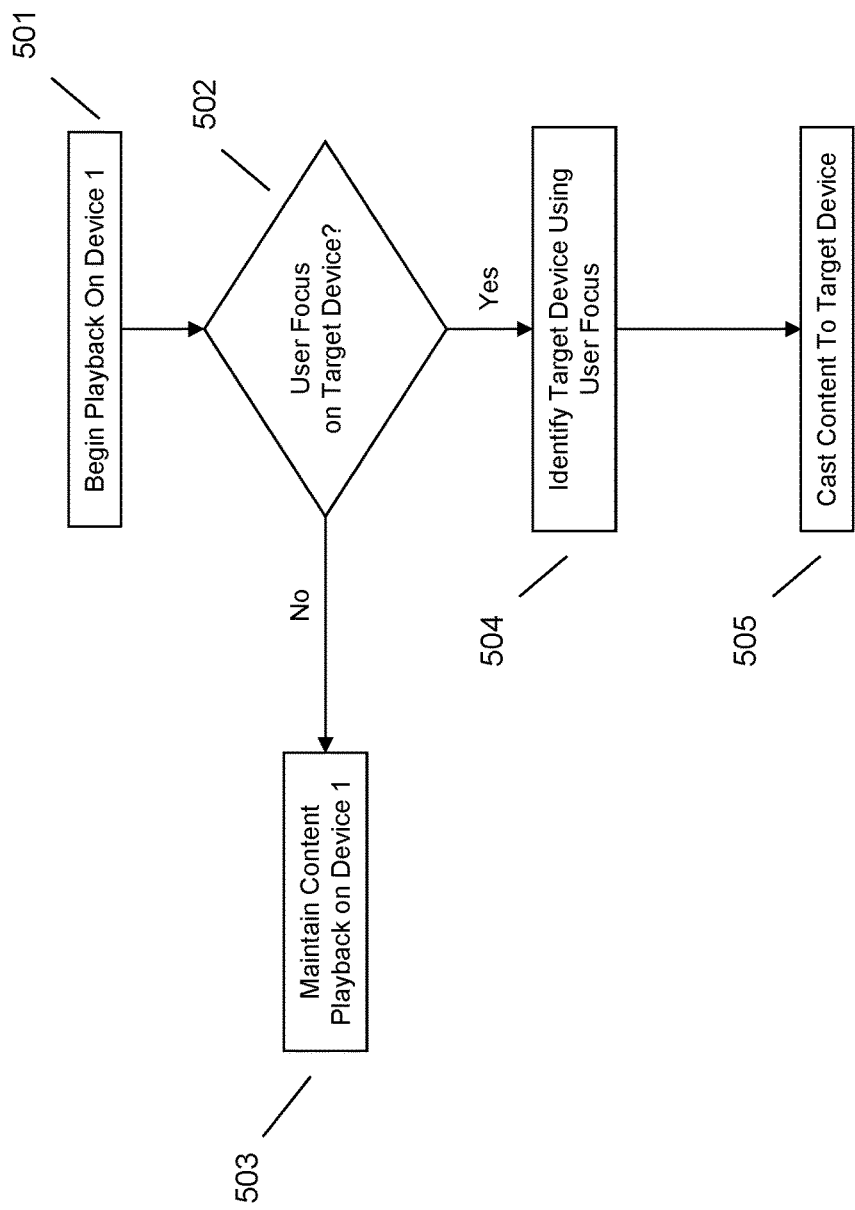
FIG. 5 illustrates an example method of identifying a cast ready target using device operator focus.

Another example of an intuitive mechanism for casting of content according to an embodiment is illustrated in FIG. 5. As shown, an embodiment may utilize gaze tracking via one or more cameras or image sensors to detect a cast ready target device. Again, a user may start content playback on Device1 at 501, then focus or look at another cast-ready target device, as detected at 502. If the cast-ready target device is in a low power state, it could be powered up for casting to occur. If the cast-ready target device was recently powered on, this could be used to increase confidence that this particular target device is about to be used for casting. User proximity to the cast-ready target device is another input that may be used to determine or increase the confidence of a determination that a user is attempting to cast content to that target device. Additionally, if no content is currently playing on the cast-ready target device, that may also be used to increase the confidence of a determination that content is about to be cast to that cast ready target device.

The user's focus or gaze, as for example determined by a camera or image sensor operating on a cast ready target device, may be used to identify a cast ready target, as illustrated at 504. For example, the cast ready target may identify that the user is looking at the cast ready target and provide a communication regarding this identification, e.g., to the source device or an intermediary device. If no such target is determined, or if the confidence of the determination is low, an embodiment may maintain playback on Device 1, as illustrated at 503.

However, if a cast ready target is identifiable using gaze tracking data, an embodiment may cast the content to the identified target, as illustrated at 505. Again, this casting may be automated or may be done in coordination with a user confirmation, e.g., depending on the confidence of the cast ready target identification.

Detection of a cast ready target may be initiated when content (e.g., audio and/or video content) has recently been started on a first device, e.g., playback has commenced for a predefined, configurable time. Other techniques for initiating the detection of a case ready target are possible, e.g., when the user moves around or stands up, or anytime content is actively playing on the user's handheld device.

After a cast-ready target device is identified, content may be played on the target device. If the user continues watching the content on the casting or source device, playback may occur on both devices. Otherwise, playback may stop on the casting or source device or the display of the content on the casting or source device may be stopped.

If multiple cast-ready target devices are identified, playback may occur on all identified target devices. Alternatively, the user may be given an option, e.g., provided by the casting device and/or one of the target devices, to select a cast ready target device. For example, the location of each cast ready target device, or other distinguishing factor, may be analyzed to draw a virtual user-selectable target device or devices on the casting or source device display for selection.

An embodiment may also discern that a particular user is performing or requesting the casting, e.g., from among users in a multi-user environment. An embodiment may identify the particular user uniquely, e.g., based on the device(s) involved (user specific phone or wearable utilized in a casting procedure, etc.). Another user may take over the control of casting, e.g., via a similar method to that outlined in FIG. 3, FIG. 4 or FIG. 5. For example, a user that is currently casting (and thus has control of the casting process) may be the primary user and/or user device to monitor for gesture, eye-tracking, alignment or other intuitive casting target identification until control is passed.

Control of casting may be temporary. For example, a first user may cast content for a certain amount of time or content to a target device, e.g., cast X pages of slides of a group presentation to a target projector device. Thereafter, another user device may take over casting, e.g., by user gesture, alignment, or eye tracking data, such that the other user's device now casts the next several pages or slides of the presentation to the target device.

In an embodiment, the connection for casting may be established or confirmed in a variety of ways using the target device. For example, the target device may send a message to a casting device in order to initiate the data stream, e.g., once the target is identified and has ascertained the casting device. For example, an embodiment may use a camera that is integrated into a target device, such as a television, etc., in order for the television to identify the casting device (e.g., via alignment and/or eye tracking data) and establish the connection to the casting device, e.g., a user's mobile device that is looking for the target device to share. This mechanism may be used to establish or confirm that the particular target device is the correct casting target.

Additionally, in an embodiment, a signal or code (e.g., an IR code) may be sent to the target device to initiate casting to the target device. For example, if a target device such as a television accepts the IR signal, then an acknowledgment may be sent to the casting device, enabling the casting communication between devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, using a processor on a first device, content intended for playback;
    identifying, using a sensor of the first device, a cast ready target device;
    said identifying a cast ready target device comprising obtaining data associating a user operating the first device with the cast ready target device, wherein the obtained data identifies a cast ready target device based upon a positional alignment of the first device and the user in relation to the cast ready target device, wherein the positional alignment is based upon at least one camera detecting a target and a confidence associated with the target; and
    directing content for casting to the cast ready target device based on the data and the confidence associated with the target.

2. The method of claim 1, wherein the obtaining comprises detecting motion data of the first device.

3. The method of claim 2, wherein the motion data indicates that the first device has moved towards the cast ready target device.

4. The method of claim 1, wherein the obtaining comprises detecting alignment data between the first device and the cast ready target device.

5. The method of claim 4, wherein the alignment data comprises image data and the alignment data indicates a substantial alignment between the first device and the cast ready target device.

6. The method of claim 1, wherein the obtaining comprises obtaining data indicating that the user operating the first device is gazing toward the cast ready target device.

7. The method of claim 6, wherein the data indicating that the user is gazing toward the cast ready target device comprises eye tracking data.

8. The method of claim 1, further comprising, receiving a signal from the target device prior to the transferring.

9. The method of claim 1, further comprising switching casting control from the user operating the first device to a second user operating a second device.

10. The method of claim 9, wherein the switching comprises obtaining data associating the second user operating the second device with the cast ready target device.

11. A device, comprising:
    a sensor;
    a processor operatively coupled to the sensor; and
    a memory storing code that is executable by the processor to:
        identify content intended for playback;
        identify, using the sensor, a cast ready target device;
            wherein the code that is executable by the processor to identify a cast ready target device is executable by the processor to obtain data associating a user operating the device with the cast ready target device, wherein the obtained data identifies a cast ready target device based upon a positional alignment of the first device and the user in relation to the cast ready target device, wherein the positional alignment is based upon at least one camera detecting a target and a confidence associated with the target; and
        direct content for casting to the cast ready target device based on the data and the confidence associated with the target.

12. The device of claim 11, wherein the code that is executable to obtain comprises code that detects motion data of the device.

13. The device of claim 12, wherein the motion data indicates that the device has moved towards the cast ready target device.

14. The device of claim 11, wherein the code that obtains comprises code that detects alignment data between the device and the cast ready target device.

15. The device of claim 14, wherein the alignment data comprises image data and the alignment data indicates a substantial alignment between the device and the cast ready target device.

16. The device of claim 11, wherein the code that obtains comprises code that obtains data indicating that the user operating the device is gazing toward the cast ready target device.

17. The device of claim 16, wherein the data indicating that the user is gazing toward the cast ready target device comprises eye tracking data.

18. The device of claim 11, further comprising code that is executable by the processor to receive a signal from the target device prior to the transferring.

19. The device of claim 11, further comprising code that is executable by the processor to switch casting control from the user operating the device to a second user operating a second device.

20. A product, comprising:
a storage device having code stored therewith, the code being executable by a processor and comprising:
code that identifies, using a processor on a first device, content intended for playback;
code that identifies, using a sensor of the first device, a cast ready target device;
said code that identifies a cast ready target device comprising code that obtains data associating a user operating the first device with the cast ready target device, wherein the obtained data identifies a cast ready target device based upon a positional alignment of the first device and the user in relation to the cast ready target device, wherein the positional alignment is based upon at least one camera detecting a target and a confidence associated with the target; and
code that directs content for casting to the cast ready target based on the data and the confidence associated with the target.

* * * * *